US005181888A

United States Patent [19]

Takahashi et al.

[11] Patent Number: 5,181,888

[45] Date of Patent: Jan. 26, 1993

[54] BELT DRIVING SYSTEM

[75] Inventors: Mitsuhiko Takahashi; Hirofumi Miyata; Shinya Yuki; Keizo Nonaka; Yoshihisa Nakano; Hiroshi Mitsuhashi; Katsuya Yamaguchi; Yasuhiko Yoshida, all of Kobe, Japan

[73] Assignee: Bando Chemical Industries, Inc., Kobe, Japan

[21] Appl. No.: 705,421

[22] Filed: May 24, 1991

[51] Int. Cl.[5] ............................................ F16H 7/22

[52] U.S. Cl. .................................... 474/101; 474/107; 474/123

[58] Field of Search ............... 474/101, 102, 151, 106, 474/107, 122, 123, 124, 125, 115, 117, 119, 127, 148

[56] References Cited

U.S. PATENT DOCUMENTS

| | | | |
|---|---|---|---|
| 1,490,196 | 4/1924 | Bercaw | 474/107 |
| 1,842,946 | 1/1932 | Prins | 474/106 |
| 1,846,665 | 2/1932 | Adams | 474/107 |
| 2,008,318 | 7/1935 | Ziegler | 474/107 |
| 2,342,863 | 2/1944 | Hlavaty | 474/106 |
| 3,407,673 | 10/1968 | Slezak | 474/107 X |
| 4,170,175 | 10/1979 | Conlon, Jr. | 101/1 |
| 4,929,219 | 5/1990 | Baker | 474/102 |

FOREIGN PATENT DOCUMENTS

| | | |
|---|---|---|
| 47-13956 | 7/1972 | Japan . |
| 51-1969 | 1/1976 | Japan . |
| 56-3208 | 1/1981 | Japan . |
| 61-1323 | 1/1986 | Japan . |

*Primary Examiner*—Rodney M. Lindsey
*Attorney, Agent, or Firm*—Armstrong, Westerman, Hattori, McLeland & Naughton

[57] ABSTRACT

A belt driving system having at least one roller for adjusting creep within a plurality of rollers. Creep detecting means provided at one end of the creep adjusting roller is rotated by torque of a flat belt in contact with the creep detecting means. Biasing means for biasing the flat belt toward the creep detecting means and roller-end displacing means for converting the torque of the creep detecting means to displacement of the end of the creep adjusting roller toward a predetermined direction so that the flat belt is moved to the direction contrary to the creep caused by the biasing means are provided. When the flat belt creeps, the creep contrary to the original creep is caused by the roller-end displacing means, and thus the original creep is compensated. Consequently, stable running of the flat belt is obtained and clear pictures of the electrophotographic machine can be also obtained.

14 Claims, 9 Drawing Sheets

BELT DRIVING SYSTEM

BACKGROUND OF THE INVENTION

The present invention relates to a belt driving system, having a photographic belt and a transcribing belt, provided in a electrophotographic machine.

A known art, for example of an electrophotographic machine, has a flat belt, including a photographic layer or dielectric layer thereon. The flat belt is wound round a plurality of parallel rollers so that the flat belt, instead of a photographic dram, performs as a photographic belt or a transcribing belt for the purpose of making the machine lightweight and compact.

A base material of the flat belt used for the above usage is mostly material of less extension and high strength such as a plastic film and a metal leaf. Thus, elastic deformation of such a belt is low. Accordingly, when that electrophotographic machine has errors such as dimensional errors of components, installing errors of rollers, unbalance of the belt tension, and uneven length of the belt, the belt cannot compensate for those errors by its elasticity. Consequently, the flat belt creeps (moves laterally) to one side in the widthwise direction of the belt when it is running.

However, the above electrophotographic machine requires high accuracy and high resolving power for a clear picture and the creeping of the flat belt should be prevented.

As disclosed in Japanese Patent Publication Gazette Nos. 56-127501 and 59-205052, a flat belt is provided with a guide for preventing creep, and as in No. 57-630347, a flat belt is provided with a restricting member in order to prevent the creep of the flat belt.

As disclosed in the Japanese Utility Model Registration Laying Open Gazette No. 58-110609, one roller having a belt-position sensor as a creep detecting means is provided for adjusting the creep. In that invention, when the belt-position sensor senses creeping of the belt, the creep is adjusted by displacing the end of a creep adjusting roller. And also as disclosed in the Japanese Utility Model Registration Laying Open Gazette No. 64-48457, when the flat belt creeps, a roller is moved in the direction of the rotating shaft and the rotating shaft of the roller is moved by the movement of the roller. Thus, the creep is adjusted by moving the roller in the direction contrary to the creep.

However, in the invention of the above Nos. 56-127501, 59-205052, and 57-60347, since the creep of the flat belt is restricted by an external factor, it may not be applicable in some cases of bad combinations of a flat belt and a roller. That is, a guide or restricting member should be strong if a belt possesses a large biasing force. Also, bending force resistance of the flat belt in the widthwise direction should be large and strength at the end of the belt should be high enough to avoid damages at side ends of the belt. Thus, the thicker the belt, the harder to apply the above embodiment. Moreover, the guide should be positioned accurately and forming the guide particularly in a seamless belt was hard.

Furthermore, in the above inventions in the Nos. 58-110609 and 64-48457, since the belt creep is detected and the belt is backed to the center by a complicated mechanism, the system will be expensive. Also, since extra space is required, the system should be large. That system possesses another disadvantage such that the system is not reliable enough since the number of components is increased due to complicated structure, which means an increased number of causes of trouble.

SUMMARY OF THE INVENTION

The object of the present invention is to provide a belt driving system which aligns the belt creep with a simple system, little space, and less expense without working on a roller and a flat belt.

In order to achieve the above object, when the flat belt creeps, one end of a roller is displaced to a predetermined direction by the running force of the belt so that the creep in the direction contrary to the original creep is caused. Concretely, the belt driving system according to the present invention comprises a flat belt, a plurality of rollers having at least one roller for adjusting the creep, a creep detecting means supported by the one end of roller for adjusting the creep and rotating independently from the roller, a biasing means for biasing the flat belt toward the creep detecting means, and a roller-end displacing means. The roller-end displacing means is connected to the creep detecting means and converts torque of the creep detecting means, the torque is received when the flat belt is in contact with the creep detecting means, to a displacement of the roller end to a predetermined direction so that the flat belt creeps back to the direction contrary to the direction of the original creep caused by the biasing means.

By the above structure, the creep detecting means rotates by contact friction with the flat belt when the flat belt creeps by the biasing means and contacts contracts with the creep detecting means. The rotation of the creep detecting means is converted to a displacement of the end of the roller for adjusting creep to a predetermined direction by the roller-end displacing means. If the end of the roller for adjusting the creep is displaced, the displacement in the direction contrary to the original creep is caused on the flat belt. Thus, the creep is adjusted. In other words, the flat belt is adjusted by being displaced at the end of the creep-adjusting roller according to the original creep. Therefore, stability of the flat belt and a clear picture can be obtained if this belt driving system is applied to an electrophotographic machine.

BRIEF DESCRIPTION OF THE DRAWING

The accompanying drawings show the preferred embodiments of the present invention, in which FIGS. 1~11 show a first embodiment, of which:

FIG. 1 is a perspective view of a belt drive system;

FIG. 2 is a vertical front view of a creep detecting means;

FIG. 3 is a perspective view of the creep detecting means from an inner side;

FIG. 4 is a perspective view of the creep detecting means from an outer side;

FIG. 5 is a descriptive diagram of a roller-end displacement means;

FIGS. 6~8 are modified embodiments of FIG. 5;

FIG. 9 is a front view of modified embodiment of a roller supporting member;

FIG. 10 is a descriptive diagram of belt tension; and

FIG. 11 is a diagram illustrating a modified embodiment of a long hole.

FIGS. 12~16 show a second embodiment, of which;

FIG. 12 is a front view near creep detecting means; and

FIGS. 13~16 are illustrating modified embodiments of the creep detecting means.

FIGS. 18 and 19 show a forth embodiment, of which;

FIG. 18 corresponds to FIG. 1, and

FIG. 19 is a diagram illustrating a system for friction coefficient measuring instrument.

FIGS. 20~22 show a fifth embodiment, of which;

FIG. 20 is a diagram illustrating positions of three rollers;

FIG. 21 is a modified embodiment of a belt driving system having four belts and corresponding to FIG. 20; and FIG. 22 is a modified embodiment corresponding to FIG. 20.

PREFERRED EMBODIMENT

First Embodiment

The first embodiment is described with accompanying drawings.

Figure 1:
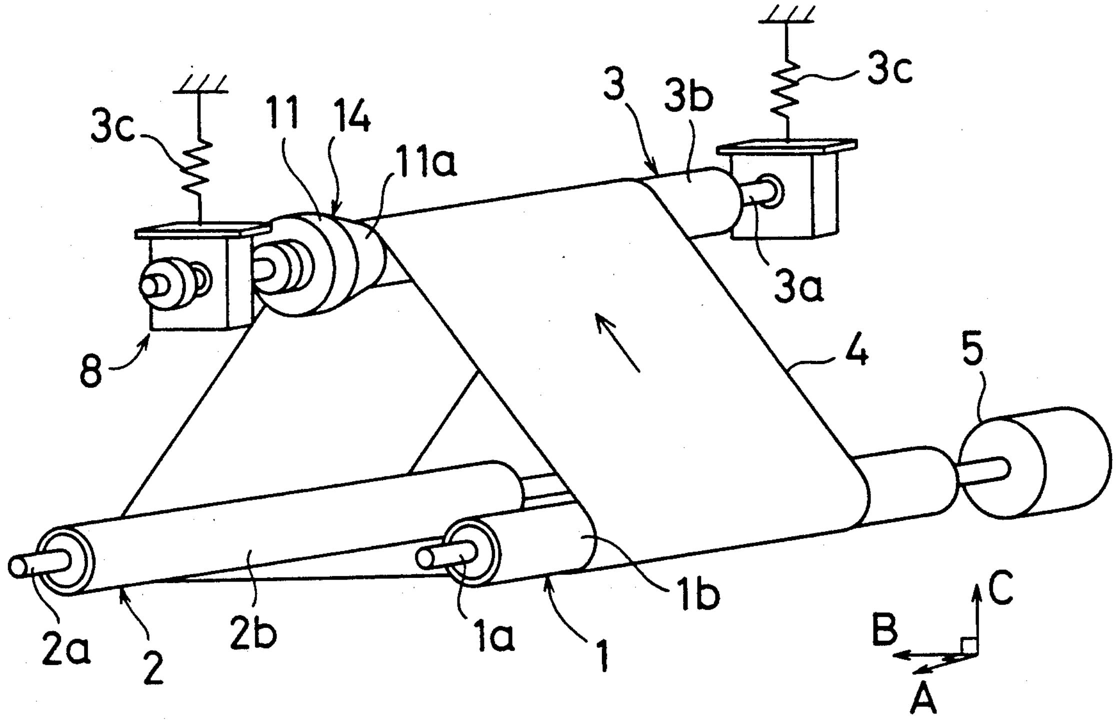

FIG. 1 shows a belt driving system in the electrophotographic machine. In this figure, reference numerals 1, 2, and 3 show the first, second, and third rollers respectively. Each roller 1, 2, and 3 comprises a shaft member 1*a*, 2*a*, and 3*a* and a cylindrical portion 1*b*, 2*b*, and 3*b*, provided coaxially and rotatable integrally with each shaft member. Each cylinder portions 1*b*, 2*b*, and 3*b*, is a size larger than the roller end and composed of a rubber such as EDPM cross-link rubber. Or it could be any material such as resin and aluminum if it is not an elastic material.

A photographic belt 4, has a photographic layer formed thereon and performs as a flat belt in the present invention, and is wound round the rollers 1, 2, and 3. Thus, in the present belt driving system, the photographic belt 4 is used for the photographic material of the electrophotographic machine. Biaxial draw polyester is used for the base material of the photographic belt 4 and tension elasticity rate is set more than 200 $kg/mm^2$.

The first roller 1 is connected to the driving motor 5 at the shaft member 1*a*, which means the first roller 1 is a drive roller.

The second roller 2 is a driven roller and the axis of it is oblique with respect to the axis of the first roller 1, which means the end of the second roller 2 in direction A is displaced a little (for example, 1 mm) to direction C with respect to the parallel line of the first roller.

The third roller 3 is a creep adjusting roller and the axis of it is approximately parallel to the axis of the first roller 1. Springs 3*c* provided at the right and left ends of the third roller 3 possess supporting force for supporting the third roller 3 in the direction C. By this biasing force, tension of the photographic belt 4 is adjusted.

By displacing the rollers 1, 2, and 3 in the above structure, the photographic belt 4 wound round the rollers 1, 2, and 3 creeps in the direction A when it runs. In other words, a biasing means is formed by making the axis of the second roller oblique with respect to the axis of the first roller.

Figure 2:
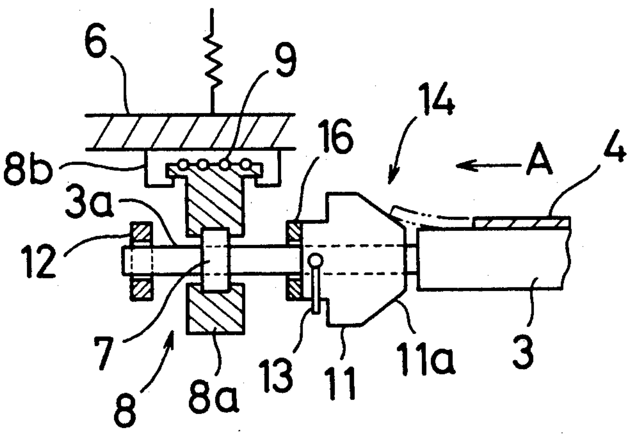
Figure 3:
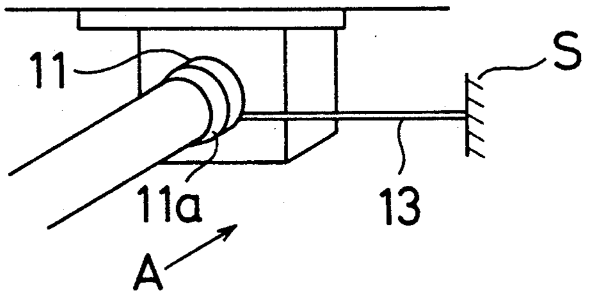

The end of the third roller 3 is, as shown in FIGS. 2 and 3, supported rotatably by a lower frame 8*a* through a bush 7 which is a bearing member. This lower frame 8*a* engages with an upper frame 8*b* provided at a movable member 6 through a slide bearing 9. By this way, roller supporting member 8 for supporting an end of the third roller 3 movably toward a direction perpendicular to the axis of the roller is formed by the upper frame 8*b*, lower frame 8*a*, and the slide bearing 9. Creep detecting means 11 is supported coaxially with the third roller 3 and rotates independently from the third roller 3 in the inner side of the lower frame 8*a* on the shaft member 3*a* of the third roller 3. A ring member 12 is mounted to an outer end, where the creep detecting means 11 is disposed, of the shaft member 3*a*.

The above creep detecting means 11 is composed of a urethane elastomer and the like which has a high friction coefficient between the surface of the photographic belt 4 and the creep detecting means 11 and has high friction resistency. The creep detecting means 11 is positioned close to the end of the cylinder portion 3*b* of the third roller 3 with a little opening. The outer diameter of the creep detecting means 11 is the same as the outer diameter of the third roller 3 at one end facing to the cylinder portion 3*b* of the third roller 3 and flares outwardly at the other end apart from the cylinder portion 3*b*, which means a surface 11*a* is tapered. By this structure, when the photographic belt 4 creeps in the direction A, the photographic belt 4 climbs the surface 11*a* of the creep detecting means 11 as shown by the alternate long and two short dashes line in FIG. 2.

The creep detecting means 11 is connected to one end of a string member 13 which is a woundable means. This string member 13 is mounted to the fixed member S. By the creep of the photographic belt 4, the photographic belt 4 climbs the surface 11*a* and the creep detecting means 11 receives the torque. The string member 13 is wound into the creep detecting means 11 by its rotation. Thus, the end of the third roller 3 in the direction A is displaced toward a direction which makes it apart from the end of the first roller 1. That is in direction B in FIG. 1. In other words, the photographic belt 4 runs in the rotating direction of the third roller 3 wherein the third roller 3 is biased to the right with respect to the belt running direction. Then, the photographic belt 4 creeps in the direction contrary to the direction A. Roller-end displacing means 14 for displacing the end of the third roller 3 in a given direction when the creep detecting means 11 receives the torque is formed by the above construction. In short, when the end of the third roller 3 is displaced in the direction B, the photographic belt 4 runs, sliding to the direction contrary to the direction A. Thus, creeping force contrary to the original creeping force (force in the direction A) is caused and the end of the third roller 3 is displaced until the original creeping force is compensated.

Figure 4:
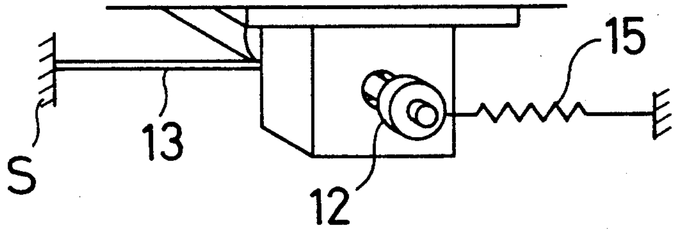

As shown in FIG. 4, a spring 15 which is a spring means is connected to the ring member 12 provided at the outer end of the shaft member 3*a*. This spring 15 biases the end of the third roller 3 in the direction contrary to the displacement caused by winding the string member 13. Thus, the displacement of the end of the third roller 3 is restricted within a predetermined level by this spring 15. Through the above construction, when the contrary creeping force caused by the displacement of the end of the third roller 3 becomes larger than the original creeping force, the photographic belt 4 starts creeping toward the direction contrary to the original creeping direction and therefore, the area of the creep detecting means 11 on the surface 11*a* is decreased and torque received by the creep detecting means 11 is also decreased. As a result, the displacement of the end of the third roller 3 is decreased by the spring 15.

A stopper 16 restricts the creep detecting means 11 from moving to an outer side.

Operation of the embodiment is described below. When the photographic belt 4 runs, force for creeping the photographic belt 4 in the direction A is applied since the second roller is oblique with respect to the first and third rollers.

Figure 5:
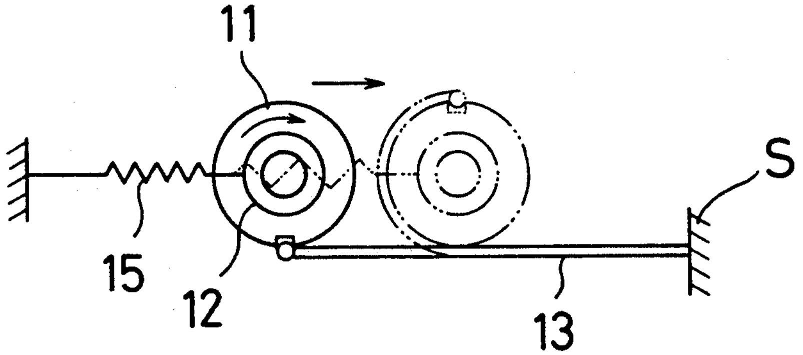

When the end of the photographic belt 4 climbs the surface 11*a* of the creep detecting means 11 because of the creep, by the friction force between the photographic belt 4 and the surface 11*a* of the creep detecting means 11, the creep detecting means 11 rotates integrally with the shaft member 3*a* and the string member 13 is wound by that rotation as shown in FIG. 5.

The roller end of the third roller 3 where the creep detecting means 11 is positioned is displaced in the direction B by winding the string member 13. The photographic belt 4 runs, creeping in the direction contrary to the direction A by that displacement and therefore, displacement of the photographic belt 4 in the direction A is restricted. At the same time, the spring 15 is extended by that displacement of the roller end and accordingly, biasing force is applied to the roller end of the third roller 3. Thus the displacement of the third roller 3 is restricted and the side end of the photographic belt 4 is kept within a confined area.

By the above structure, creep of the photographic belt 4 is restricted, for example, to about 10 μm. In other words, the photographic belt 4 creeps in one direction first and that creep is compensated so that the creep is small. Consequently, stable running of the photographic belt 4 can be maintained and clear picture in the electrophotographic machine of the present invention can be maintained.

In the present embodiment, the second roller 2 is oblique with respect to the rollers 1 and 3 so that the photographic belt 4 creeps in the direction A. However, the third roller can be oblique with respect to the rollers 1 and 2 by the spring 15 in order to make photographic belt 4 creep in the direction A when the photographic belt 4 is not in contact with the creep detecting means 11.

Figure 6:
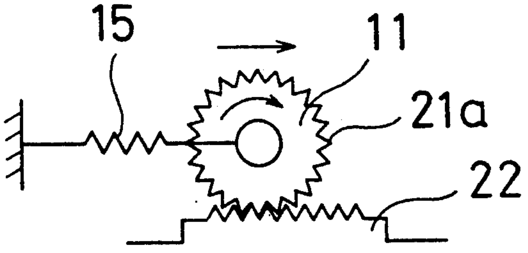
Figure 7:
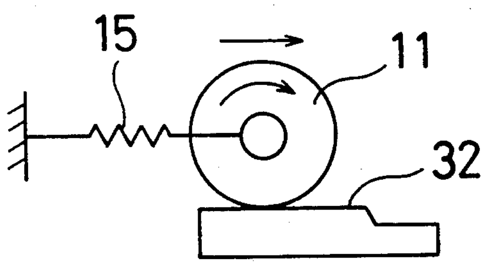
Figure 8:
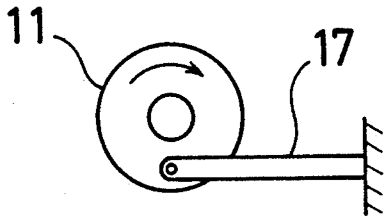

In the present embodiment, the string member 13 is used as a woundable member at the roller-end displacing means 14. However, a spiral spring can be used instead of a woundable member in order to eliminate the spring 15. As shown in FIG. 6, an outer gear 21*a*, instead of the string member 13, can be formed on an outer circumference of the creep detecting means 11 and the roller end as displaced by that the gear 21*a* meshes with a rack gear 22. Also, as shown in FIG. 7, friction force with a friction board 32 can be used for the string member 13 by raising the friction coefficient of a part of the outer circumference of the creep detecting means 11. Moreover, as shown in FIG. 8, a rod 17, having one end thereof connected to a position apart from the rotational center of the creep detecting means 11 and the another end connected to a fixed member 5, can be used for the string member 13.

A tapered surface 11*a* of the creep detecting means 11 is preferably formed for better transmitting the torque of the belt to the creep detecting means 11. However, this taper is not necessarily required, but the surface 11*a* can be a cylinder which has the same diameter of the third roller 3 all the way.

In the present embodiment, the spring member 15 is used as a spring means which biases the end of the third roller in the direction contrary to the displacement caused by the roller-end displacing means 14. However, another instrument can be used if it accomplishes that object.

Next, the modification of a roller supporting member 8 is described below.

Figure 9:
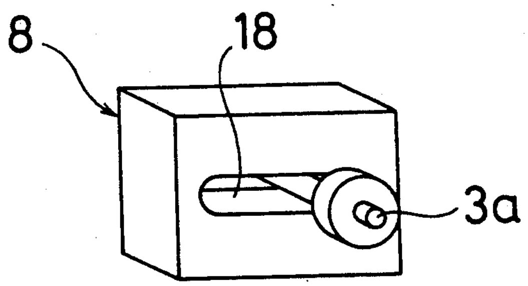

As shown in FIG. 9, the roller supporting member 8 of the present embodiment has a long hole 18 formed therein, and the roller end 3*a* of the third roller 3 passes therethrough. This long hole 18 extends in the direction which the outer end of the shaft member 3*a* moves when the string member 13 is wound onto the creep detecting means 11. When the outer end of the shaft member 3*a* moves, the outer end moves inside the long hole 18.

Figure 10:
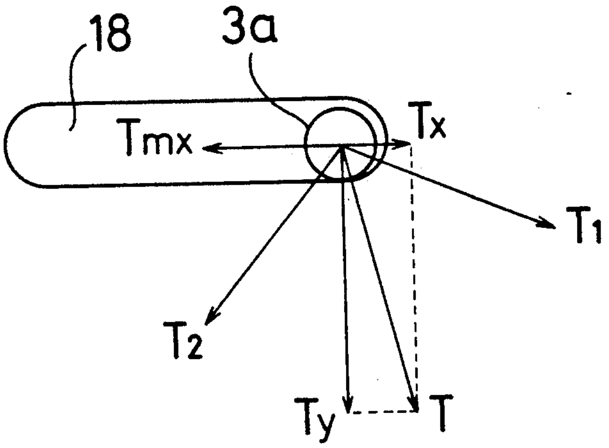

When the photographic belt 4 does not creep, which means a normal running state, the tension vector T of the tension vectors $T_1$ and $T_2$ of the photographic belt 4 can be expressed by $T_X$ and $T_Y$ for X direction and Y direction as shown in FIG. 10.

$T_X$ and $T_Y$ possess the following relationship:

$$T_X - \mu_R T_Y > 0 \quad (1)$$

where $\mu_R$ is a friction coefficient between the shaft member 3*a* and inner side of the long hole 18 and photographic belt 4 runs when the shaft member 3*a* is positioned as shown in FIG. 10.

$T_X$ and $T_Y$ also possess the following relationship when the photographic belt 4 creeps and climbs the creep detecting means 11 and the creep detecting means 11 winds the string member 13, $$T_{MX} - \mu_S T_Y > T_X - \mu_R T_Y \quad (2)$$

where $T_{MX}$ is a tension force of winding the string member in X direction by the torque of the creep detecting means 11 when the belt climbs the creep detecting means 11, and $\mu_S$ is a friction coefficient between the shaft member 3*a* and inner side of the long hole 18.

Thus, the roller end 3*a* moves to the left in FIG. 10 and adjusts the creep of the photographic belt 4.

As mentioned above, the outer end of the shaft member 3*a* of the third roller 3 passes through the long hole 18. Thus, the shaft member 3*a* moves along inside the long hole 18 and the shaft member 3*a* can be supported movably with simple construction, instead of using a slide bearing and the like.

The friction coefficient of the inner side of this long hole 18 is preferably small and an oil-less bearing made of plastic including an oil impregnated plastic and lubricant plastic can be used for it.

Figure 11:
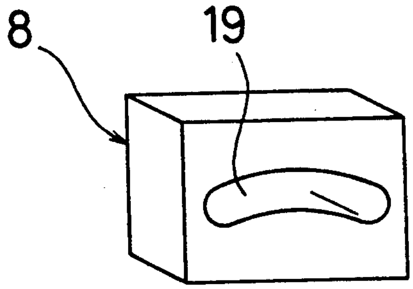

Also, an arcuate long hole 19 projecting upwardly as shown in FIG. 11 or projecting downwardly can be used for a long hole In the present embodiment, only one roller is used for adjusting creep. However, two rollers can be provided for that.

In the above embodiment, the present invention is applied to the photographic belt of the electrophotographic machine. However, the present invention is applicable to other types of belt driving systems such as a driving system for a copying machine and a flat belt driving system.

In cases where the photographic belt 4 is a metal belt such as a nickel and the like, the creep detecting means 11 is constructed of an oil impregnated plastic, super macromolecule polyethylene, nylon, polyacetal, and a mixture of lubricating oil plastic and solid lubricant such as boron nitride, graphite, molybdenum disulfide, and titanium sulfide. By this way, the friction coefficient between the photographic belt 4 and the creep detecting means 11 can be kept low. Thus, abrasion of the creep detecting means 11 can be lowered and longer service life of the photographic belt 4 can be obtained.

Second Embodiment

The second embodiment of the present invention is described below. This embodiment relates to the creep detecting means 11.

Figure 12:
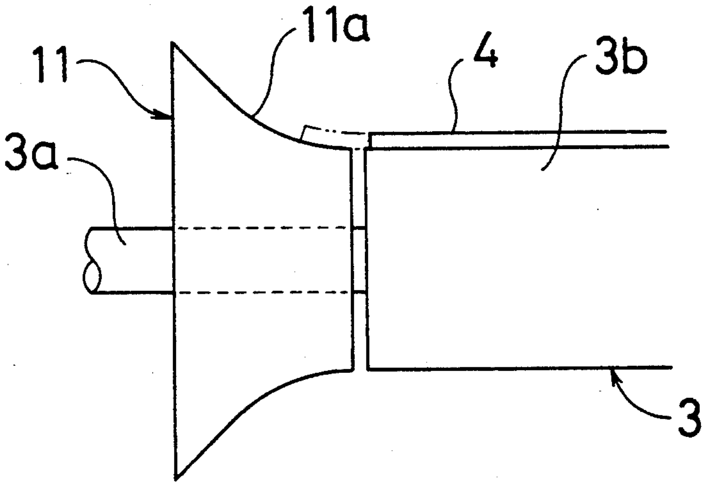
Figure 13:
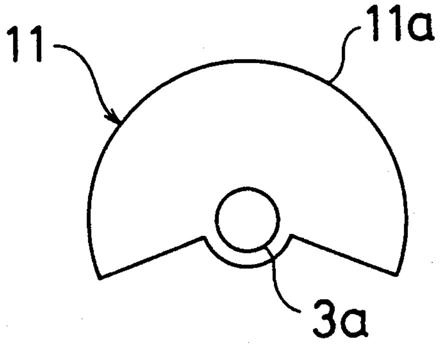

As shown in FIG. 12, the surface 11*a* of the creep detecting means 11 flares outwardly in a concaved curve to an increasing diameter at the end apart from the cylinder portion 3*b* of the third roller 3. That is, the end of the cylinder portion 3*b* of the third roller 3 is followed by the inner end of the surface 11*a* of the creep detecting means 11. As shown by the alternate long and two short dashed line, when the photographic belt 4 climbs the surface 11*a*, the photographic belt 4 does not bend on the boundary between the cylinder portion 3*b* and the creep detecting means 11 and accordingly, a longer service life of the photographic belt 4 can be obtained. Also, in case that the area of the belt on the creep detecting means 11 is large, the response for adjusting creep can be done quickly since the friction force between the photographic belt 4 and the surface 11*a* is increased.

The surface 11*a* of the creep detecting means 11 can be formed in a range where the photographic belt 4 climbs.

Next, other modifications of the creep detecting means 11 is described.

Figure 14:
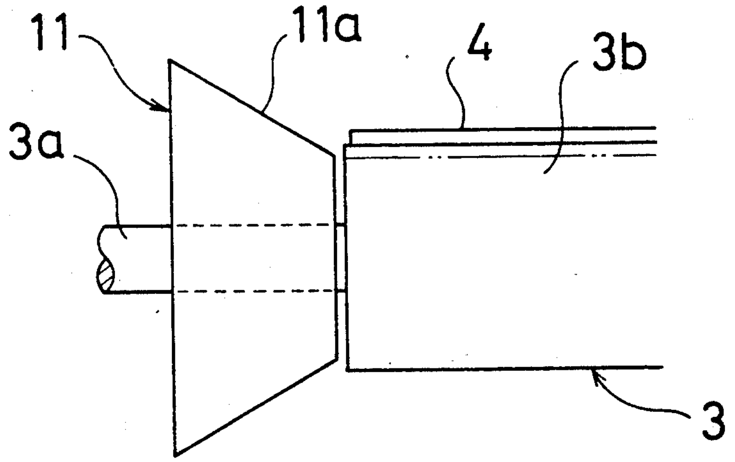

The end facing to the cylinder portion 3*b* of the third roller 3, i.e., the vertical face of the creep detecting means 11 facing to the cylinder portion 3*b* in FIG. 14, is a size smaller than the outer diameter of the third roller 3. By this structure, when the photographic belt 4 creeps, the end of the photographic belt 4 climbs the surface 11*a* securely after contacting it. Also, when the excess tension is applied to the photographic belt 4 and the photographic belt 4 presses the cylinder portion 3*b*. Even thus the cylinder portion 3*b* is deformed in radius direction as shown in FIG. 14, the end of the photographic belt 4 does not contact with the inner end side of the creep detecting means 11 and the photographic belt 4 climbs the surface 11*a* smoothly.

Figure 15:
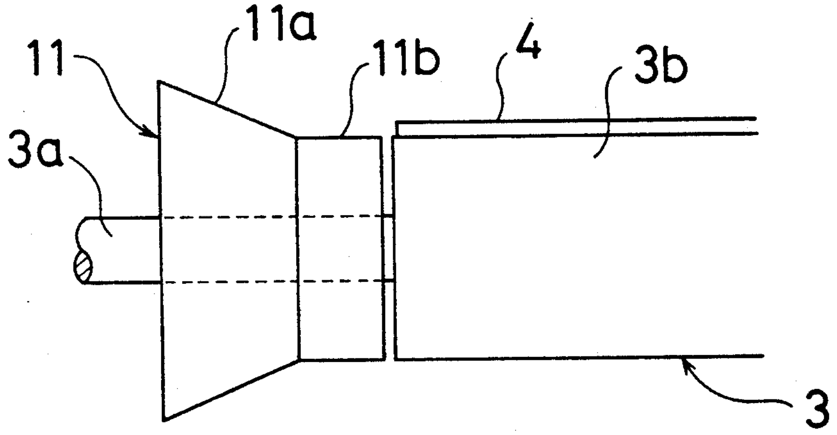

The creep detecting means 11 of FIG. 15 has a column part 11*b* provided integrally in inner side of the surface 11*a*. The diameter of this column part 11*b* is the same as the outer diameter of the third roller 3 and extends horizontally from end of the inner side of the surface 11*a* to the third roller 3. By the above structure, when the photographic belt 4 creeps, the photographic belt 4 contacts with the column part 11*b* and when photographic belt 4 creeps more it climbs the surface 11*a*. When the photographic belt 4 is in contact with the column part 11*b*, the torque received by the creep detecting means 11 is small and when the photographic belt 4 climbs the surface 11*a*, that torque is large. Thus, the larger the creep of the photographic belt 4, the larger the torque received by the creep detecting means 11. By this way, rotation of the creep detecting means 11 which is proper for the creep can be obtained and the displacement of the end of the creep adjusting roller can be controlled.

Figure 16:
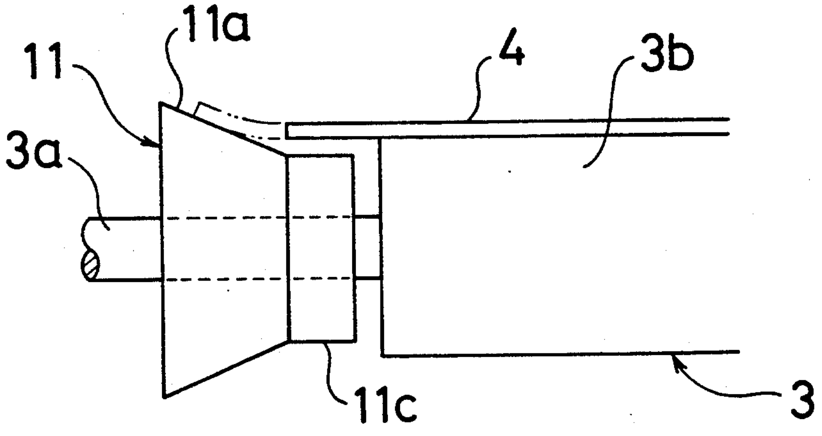

The creep detecting means 11 of FIG. 16 has column part 11*c* of a smaller diameter provided integrally in inner side of the surface 11*a*. The diameter of the column part 11*c* is smaller than the outer diameter of the third roller 3 and extends horizontally from the inner side of the surface 11*a* to the third roller 3. In this embodiment, the side end of the photographic belt 4 is positioned to face to the outer circumference of the column part 11*c* of a small diameter as shown by the continuous line in FIG. 16. By the above structure, when the photographic belt 4 creeps, as shown in alternate long and two short dashes line in FIG. 16, the photographic belt 4 climbs the surface 11*a*, keeping the space between the belt and the column part 11*c* of a smaller diameter. Thus, when the photographic belt 4 creeps, the photographic belt 4 is not rolled up in the opening between the cylinder portion 3*b* and the creep detecting means 11. In short, the system can be simplified since the space between the cylinder 3*b* and the photographic belt 4 does not require highly precise dimensional accuracy.

Third Embodiment

Figure 17:
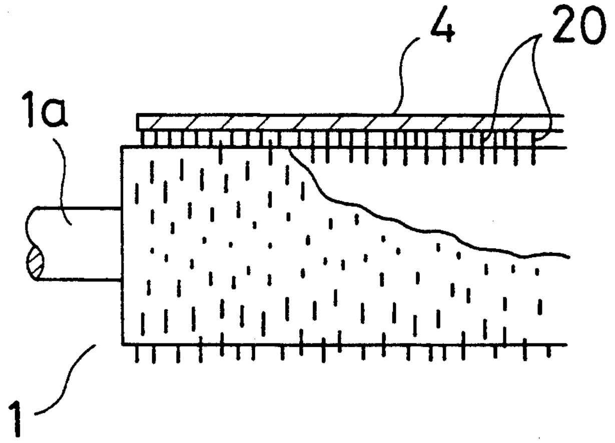
FIG. 17 is a front sectional view of a first roller of a third embodiment.

Next, the third embodiment is described below. As shown in FIG. 17, cylinder portions 1*b*, 2*b* of the first and second rollers 1, 2 out of three rollers 1~3 (only the first roller 1 is shown in FIG. 17) includes a plurality of aramid fibers, the length of the aramid fibers is 1 mm~10 mm. A part of each aramid fiber 20 is projecting outwardly 0.01~1.00 mm in the radius direction of each cylinder portion 1*b*, 2*b* from the surface of that cylinder portion. When the belt driving system operates, the cylinder portions 1*b* and 2*b* of the first and second rollers 1 and 2 do not contact with the photographic belt 4 directly, but through the aramid fibers. To obtain this construction, aramid fibers 20 are mixed with the rubber when the cylinder portions 1*b* and 2*b* are formed, and thereafter the cylinder portions 1*b* and 2*b* are abraded.

Since the aramid fibers 20 are projecting on the surface of cylinder portions 1*b* and 2*b*, the friction coefficient between the cylinders 1*b* and 2*b* and the photographic belt 4 is set properly. When slip occurs between them, that slip is allowed and the photographic belt 4 and cylinders 1*b* and 2*b* are prevented from breaking. Moreover, since they do not contact with each other directly, surfaces of them are not affected by humidity and temperature. Thus, a constant friction coefficient is obtained so that the running of the belt is stabilized. Furthermore, since fibers of high rigidity are in contact with the photographic belt 4, the holding power for cylinders 1*b* and 2*b* to hold the photographic belt 4 is high. The driving of the first roller is transmitted securely and the stable running can be obtained thereby. The third roller 3 does not have aramid fibers 20 and the friction coefficient between the third roller 3 and the photographic belt 4 is set higher than that of the first and second rollers. Accordingly, creep adjusting of the third roller 3, i.e., displacement toward the direction contrary to the direction A of the photographic belt 4, can be carried out smoothly and securely.

In this embodiment, the projecting part, a needle-like thing, can vary between 0.01~1.00 mm according to the friction coefficient which is required by the system, belt, and rollers.

In this embodiment, the aramid fibers 20 are embedded on the cylinder portions 1*b* and 2*b* and the cylinder portions 1*b* and 2*b* are abraded to make the aramid fibers project from the surface. However, the aramid fibers 20 can be attached to the surface of the cylinder portions 1*b* and 2*b* directly.

Also, the short fibers are not limited to aramid fibers, but, other organic fibers (for example PET and Nylon), carbon fibers, and filar of no needle (for example, silicon carbide and iron oxide) can be used.

Figure 18:
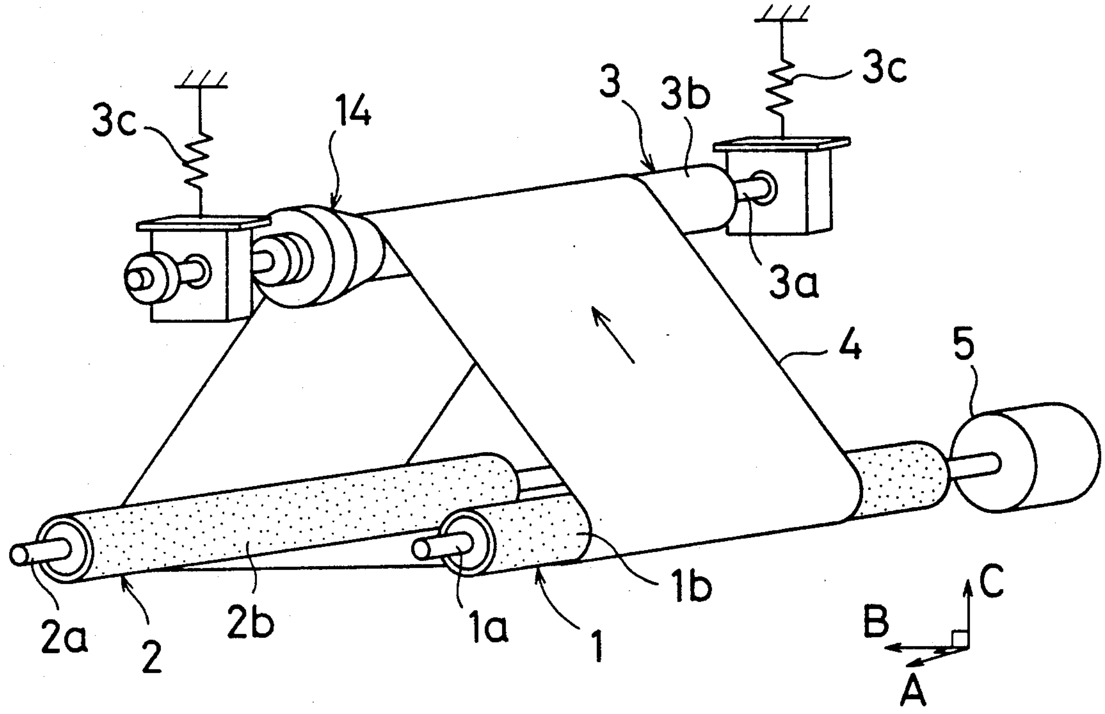

The forth embodiment is described below. As shown in FIG. 18, the cylinder portions 1*b* and 2*b* of the first roller and second rollers 1 and 2 are composed of a rubber which is abraded after 20% of weight part of short fibers is mixed therewith. The cylinder 3*b* of the third roller 3 is composed of only an elastic material, for example cross-linking rubber of EDPM. Other than the above EDPM cross-linking rubber, a material possessing high friction coefficient and low friction resistance, for example a urethane rubber, can be used.

That are, the short fibers of organic material is mixed to the cylinder portions 1*b* and 2*b* of the first and second rollers 1 and 2 and the surfaces of the rollers are abraded so that the friction coefficient of the roller surface contacting with the belt surface is lowered as described hereinafter. Thus, the friction coefficient between the third roller 3 which is a creep adjusting roller and the photographic belt 4 is set larger than that between the other rollers 1 and 2 and the photographic belt 4.

By the above structure, the cylinder portions 1*b* and 2*b* of the first and second rollers 1 and 2 are composed of a rubber where short fibers are mixed therein, having the hard and abraded surface. On the other hand, the cylinder portion 3*b* of the third roller 3 is composed of soft rubber. The friction coefficient between the third roller 3 and the photographic belt 4 is larger than those of the first and second rollers 1 and 2. When the photographic belt 4 creeps, if the end of the third roller 3 is displaced in the direction B by the roller-end displacing means 14, a force for adjusting the creep of photographic belt 4 is applied on the third roller 3 and resistance to the creep adjusting on the other rollers 1 and 2 is small. Thus, the creep adjusting is carried out smoothly.

As a result, the displacement of the third roller 3 for adjusting creep can become small and the photographic belt 4 moves smoothly when being adjusted the creep. Also, the deformation in the widthwise direction on the belt surface can be prevented effectively.

Cylinder portions 1*b*~3*b* of the rollers 1~3 are composed of elastic materials in the present embodiment. However, cylinder portions 1*b* and 2*b* of the first and second rollers 1 and 2 can be composed of metal and only the cylinder portion 3*b* of the third roller 3 is composed of elastic material so that the friction coefficients with the photographic belt 4 are different. In this case, during the electrophotographic picture being processed, an object such as a carrier, toner, and a piece of paper in developer may stray in the back surface of the photographic belt 4 and consequently, the photographic belt 4 may be damaged.

As shown in the present embodiment, the cylinder portion 3*b* (surface of the roller contacting with the belt) of the third roller 3 is composed of elastic material and short fibers are mixed in the cylinder portions 1*b*, 2*b* of the first and second rollers 1, 2, while surfaces, in contact with the belt, of the all three rollers 1~3 are composed of elastic materials. Thus, the friction coefficient of the surface, in contact with the belt, of the third roller 3 is larger than those of the first and second rollers. This results in maintaining smooth creep adjusting and prevention of photographic belt 4 from being damaged.

If the surface, in contact with the rollers, of the photographic belt 4 is composed of materials harder than elastic materials, such as metal and plastic, it has an advantage in that the damage of the photographic belt 4 caused by an object strayed in the belt is prevented.

Test

A test for the forth embodiment is described below.

Figure 19:
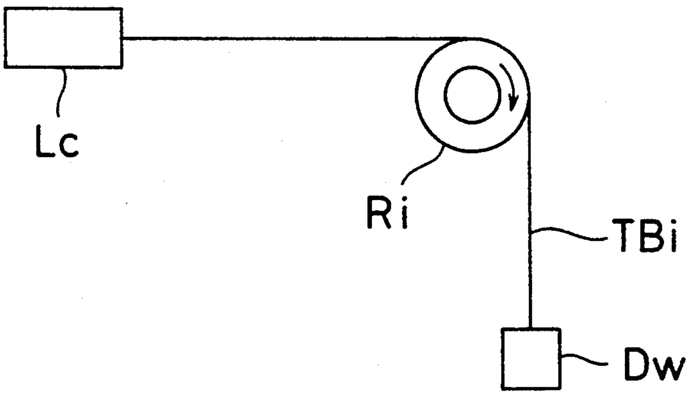

First, the friction coefficient between the surface, in contact with the belt, of the roller and the flat belt is measured. As shown in FIG. 19, testing belt TBi is wound round the roller Ri, one end of the testing belt TBi is connected to a load cell Lc. The friction coefficient $\mu'$ is obtained from the following equation:

$$\mu' = 2\times \ln(T1/T2)/\pi$$

where T1 is a load applied to a load cell Lc when a roller Ri (16 mm in diameter and 270 mm in roller length) rotates at a given speed (36 mm/sec.), and T2 is a load applied to the end of the testing belt TBi, which means a weight $D_W$ (T2 is 0.385 Kg or 1.75 Kg).

The actual friction coefficient $\mu'$ of the various combination of rollers and belt is shown in the Table 1 below.

TABLE 1

| No. | Roller Material | Belt Material PET | Belt Material Ni |
|---|---|---|---|
| A | EPDM Rubber | 1.15 | 1.05 |
| B | Rubber Mixed With Short Fibers | 0.51 | 1.42 |
| C | Aluminum | 0.32 | — |

The following Table 2 shows displacement of the creep adjusting roller and deformation in the widthwise direction of the belt in various combination of the belt and rollers. In the test data, Nos. 1 and 2 are belts of the present invention and Nos. 3~6 are belts of comparative examples. Notations A, B, and C mean EPDM rubber, rubber mixed with short fibers, and aluminum in the above Table 1 respectively.

TABLE 2

| | No. 1 | No. 2 | No. 3 | No. 4 | No. 5 | No. 6 |
|---|---|---|---|---|---|---|
| Belt | PET | Ni | PET | PET | PET | PET |
| Rollers | | | | | | |
| Creep Adjusting Roller | A | A | A | B | B | C |
| Drive Roller | B | B | A | B | A | C |
| Driven Roller | B | B | A | B | A | C |
| Roller-end Displacement (mm) | 0.3 ~0.4 | 0.2 ~0.4 | 0.7 ~1.0 | 0.8 ~1.1 | 0.9 ~1.2 | 0.7 ~1.0 |
| Widthwise Deformation | No | No | Yes | No | Yes | No |
| Belt Damage | No | No | No | No | No | Yes |

In this test, belt width is 250 mm, belt length is 140 mm, and belt tension, which is biasing force of the spring 3*c*, is 2 Kg.

As shown in the Table 2, a combination of which the creep adjusting roller is composed of EPDM rubber and drive and driven rollers are composed of rubber mixed with short fibers, deformation in the widthwise direction is not caused and also the roller-end displacement of the creep adjusting roller is small (refer to Nos. 1 and 2 in the table). However, in combinations other than the above mentioned combination, deformation in the widthwise direction is caused. If all rollers are composed of the same material, rubber mixed with short fibers, roller-end displacement is large even though widthwise deformation is not caused. The above data and description tell how the present invention is effective.

Fifth Embodiment

Figure 20:
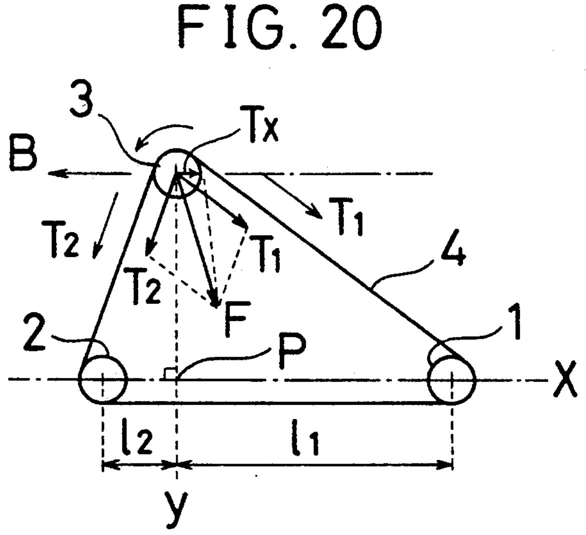

The fifth embodiment is described below. As shown in FIG. 20, the roller 3 is positioned rather on the second roller side than the mid point between the first and the second roller. That is, the rollers possess following relationship:

$$l_1 > l_2$$

where $l_1$ is a distance between the first roller 1 and the point P which is the crossing point of line X between the rollers 1 and 2 and the line perpendicular to the line X from the roller 3, and $l_2$ is a distance between the second roller 2 and the point P.

From the above construction, the vector F, which is tension $T_1$ between the photographic belt 4 and the first roller 1 at the position of the third roller 3 combined with tension $T_2$ between the photographic belt 4 and the second roller 2 at the position of the third roller 3, possesses component $T_X$. This $T_X$ is contrary to the direction B of the displacement at the end of the third roller caused by the string member 13. In other words, the displacement at the end of the third roller 3 is restricted to be less than a predetermined level by that biasing force in direction contrary to the displacement at the third roller 3 caused by the string member 13 being applied.

When the biasing force, contrary to the original creep, caused by displacing the end of the third roller 3 is larger than the original creep, the photographic belt 4 starts creeping in the direction contrary to the original creep and accordingly the area of the belt on the creep detecting means 11 is reduced. As a result, the torque of the creep detecting means 11 is decreased and the displacement of the end of the third roller 3 is decreased by the biasing force of the vector F of the belt tension.

The operation is described below. When the end of the photographic belt 4 climbs the surface 11*a* of a taper of the creep detecting means 11 by the creep of the photographic belt 4, the creep detecting means 11 is rotated by the friction force between the photographic belt 4 and the creep detecting means 11 and the string member 13 is wound by that rotation.

The end, having the creep detecting means 11 thereon, of the third roller 3 is displaced by winding the string member 13. the creep of the photographic belt 4 in the direction A is restricted by that displacement. Since the vector F, which the tensions $T_1$ between the third roller 3 and the first roller 1 and $T_2$ between the third roller 3 and the second roller 2 are combined with, is applied in order to compensate the displacement of the roller-end, the displacement of the end of the third roller 3 is restricted by the balance between the winding force of the string member 13 and the biasing force of the combined vector F. Thus, the end of the photographic belt 4 is kept within a confined area. Consequently, running of the photographic belt 4 is stabilized and the creep of the photographic belt 4 is limited to about 10 $\mu$m.

In order to give the biasing force contrary to the winding force of the string member 13, an instrument, for example a spring, may be provided. However, in that case, a spring and a bush for connecting the spring and the shaft member 3*a* will be required. On the contrary, in this embodiment, the number of components can be reduced.

Figure 21:
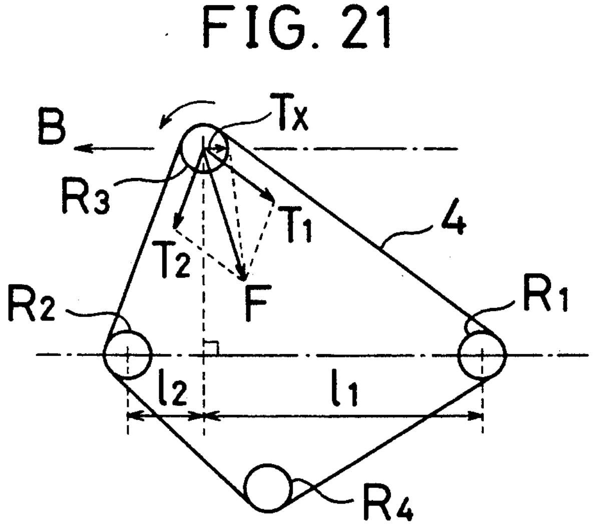

Moreover, in the present embodiment, the belt driving system of photographic belt has three rollers 1~3. However, a system having four or more rollers as shown in FIG. 21, which has four rollers R1~R4, can be used if the vector F, which the belt tensions $T_1$ and $T_2$ between the third roller R3 for adjusting creep and a pair of rollers R1 and R2 (the first and the second rollers) adjacent to the third roller 3 are combined with, possesses the component contrary to the direction B of the displacement caused by the string member 13. This will be clear when comparing with FIG. 20.

The modified embodiment of the fifth embodiment is described below.

Figure 22:
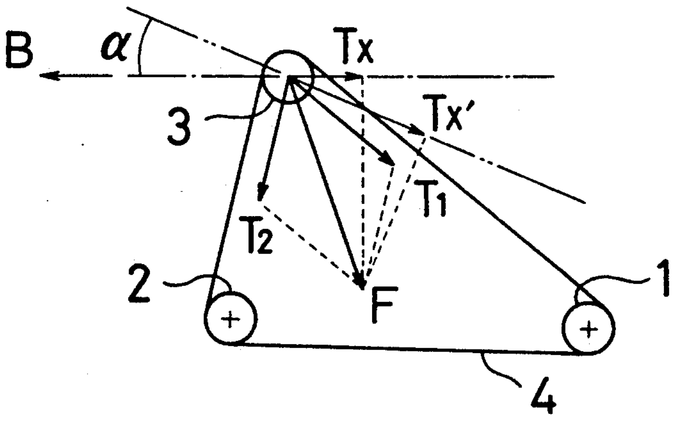

FIG. 22 shows a relationship between the position of the rollers 1~3 and the displacement of the end the third roller 3 caused by the roller-end displacing means 14. In this embodiment, the direction of displacement caused by the roller-end displacing means 14 at the end of the third roller 3 is oblique outwardly at a predetermined angle, $\alpha$ (shown in alternate long and two short dashes line), with respect to the direction B (shown by the alternate long and short dash line in the figure) between the first and second rollers. That is, the slide surface of the slide bearing 9 of FIG. 2 in the first embodiment is oblique (which is not shown in FIG. 22). Other structure is identical with the fifth embodiment.

Since the direction of the displacement caused by the roller-end displacing means 14 at the end of the third roller 3 is oblique outwardly at a predetermined angle, $\alpha$, the component $T_X'$ of the vector F contrary to the roller displacing direction is larger than that of the fifth embodiment ($T_X$ in the direction B). Here, the vector F is a belt tension between the third roller 3 and the first roller 1 combined with the tension between the third roller 3 and the second roller 2. Accordingly, the biasing force against the displacement caused by the roller-end displacing means 14 at the end of the third roller 3 becomes larger. Consequently, the displacement of the shaft 6 member 3*a* can be restricted to be small and creep detecting is improved.

We claim:

1. A belt driving system comprising:

a flat belt;

a plurality of rollers, said flat belt being wound round said rollers, at least one of said rollers being a drive roller, and at least one of said rollers being a creep adjusting roller for adjusting creep of said belt;

creep detecting means, supported by an end of said creep adjusting roller, rotatable independently from said creep adjusting roller;

biasing means for biasing said flat belt toward said creep detecting means; and roller-end displacing means, connected to said creep detecting means, for converting torque received by said creep detecting means when said flat belt is in contact with said creep detecting means to a movement for displacing said end of said creep adjusting roller in a predetermined direction so that said flat belt is moved in direction contrary to creep caused by said biasing means;

said roller-end displacing means comprising a woundable member having one end thereof connected to said creep detecting means for winding said woundable member and another end connected to a fixed member.

2. A belt driving system as claimed in claim 1, wherein a surface, in contact with said flat belt, of said creep adjusting roller is composed of a material having a higher friction coefficient than materials of surfaces, in contact with said flat belt, of other rollers.

3. A belt driving system as claimed in claim 1, wherein said creep adjusting roller is positioned in order that a vector, which is the belt tension between said creep adjusting roller and one of a pair of adjacent rollers is combined with belt tension between said creep adjusting roller and another one of a pair of adjacent rollers, possesses a component contrary to said roller-end displacement caused by roller-end displacing means.

4. A belt driving system as claimed in claim 1, further comprising spring means for biasing said end of creep adjusting roller in direction contrary to displacement caused by roller-end displacing means.

5. A belt driving system as claimed in claim 1, wherein a driven roller is formed within said plurality of rollers and said biasing means is formed by disposing said driven roller obliquely with respect to said drive roller.

6. A belt driving system as claimed in claim 1, wherein said biasing means is formed by disposing said creep adjusting roller obliquely with respect to said drive roller when said flat belt is not in contact with said creep detecting means.

7. A belt driving system as claimed in claim 1, wherein the tension elasticity rate of said flat belt is higher than 200 $Kg/mm^2$.

8. A belt driving system as claimed in claim 1, wherein a photographic layer is formed on a surface of said flat belt.

9. A belt driving system as claimed in claim 1, wherein a dielectric layer is formed on a surface of said flat belt.

10. A belt driving system as claimed in claim 1, wherein said end of said creep adjusting roller having said creep detecting means thereat is supported by a roller supporting member, said roller supporting member having a long hole extending in direction of displacement caused by said roller-end displacing means provided at said end of said creep adjusting roller which passes through said long hole.

11. A belt driving system as claimed in claim 1, wherein a surface upon which said flat belt claims is formed on an outer circumference of said creep detecting means, said surface flaring outwardly to an increasing diameter at an end apart from said creep adjusting roller.

12. A belt driving system as claimed in claim 11, wherein a column part having the same diameter as said creep adjusting roller is formed on an inner side of said surface of said creep detecting means and extends towards said creep adjusting roller.

13. A belt driving system as claimed in claim 1, wherein at least one roller of said plurality of rollers except said creep adjusting roller is provided with a plurality of short fibers projecting outwardly on a surface of said roller.

14. A belt driving system as claimed in claim 13, wherein said short fibers projects outwardly 0.01 ~ 1.00 mm from said surface of said roller.

* * * * *

UNITED STATES PATENT AND TRADEMARK OFFICE

CERTIFICATE OF CORRECTION

PATENT NO. : 5,181,888
DATED : January 26, 1993
INVENTOR(S) : TAKAHASHI et al.

It is certified that error appears in the above-indentified patent and that said Letters Patent is hereby corrected as shown below:

On the title page, Item [73], in the Assignee's name,
change "Bando Chemical Industries, Inc."
to --Bando Chemical Industries, LTD.--

Signed and Sealed this

Fourth Day of October, 1994

Attest:

Bruce Lehman

BRUCE LEHMAN

*Attesting Officer* *Commissioner of Patents and Trademarks*